July 7, 1953
J. C. HAMMOND
2,644,739
BATTERY TESTER
Filed Feb. 7, 1949
4 Sheets-Sheet 1
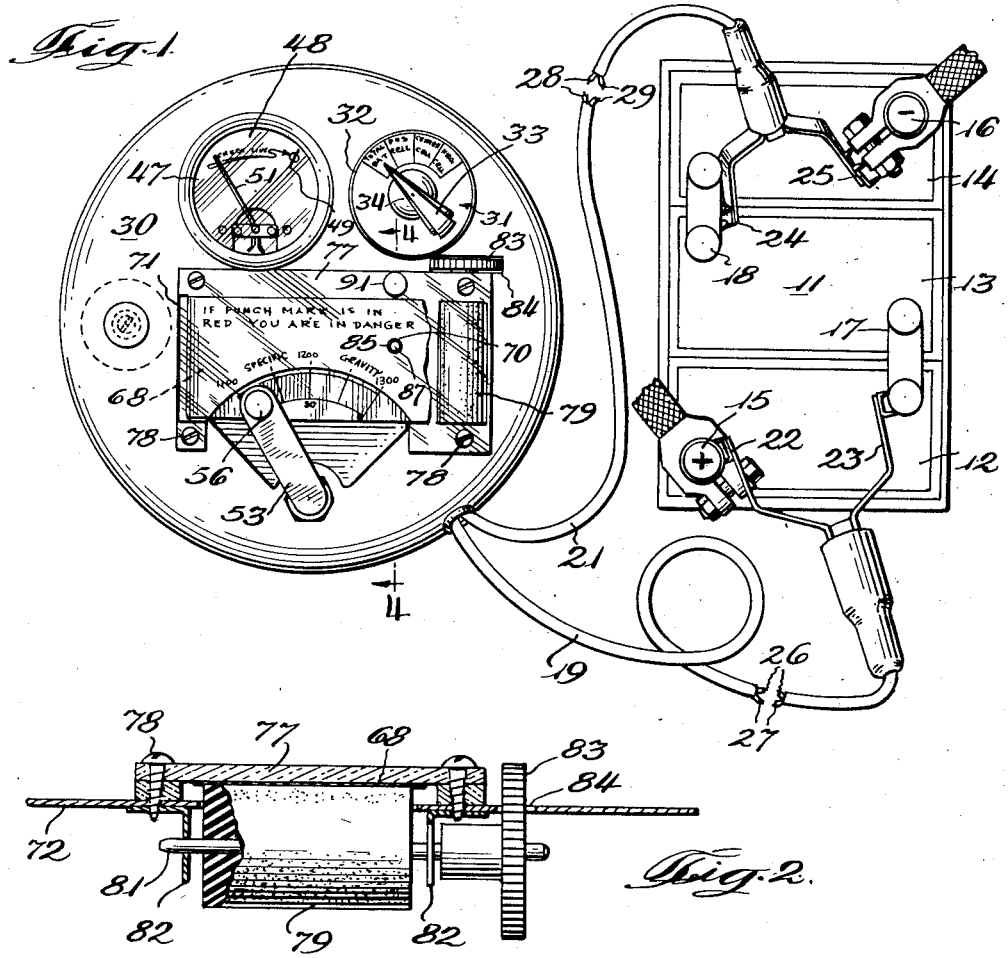
Inventor
Jasper C. Hammond
By Bair & Freeman
attorneys

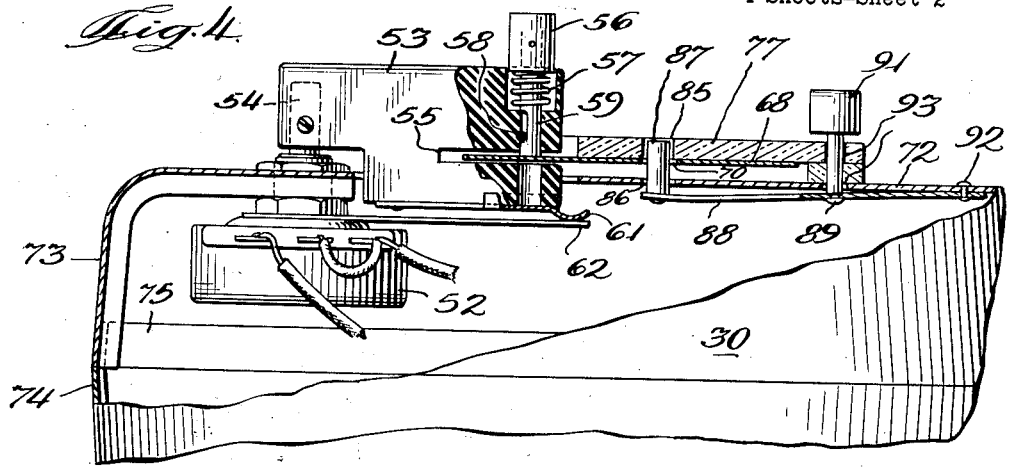
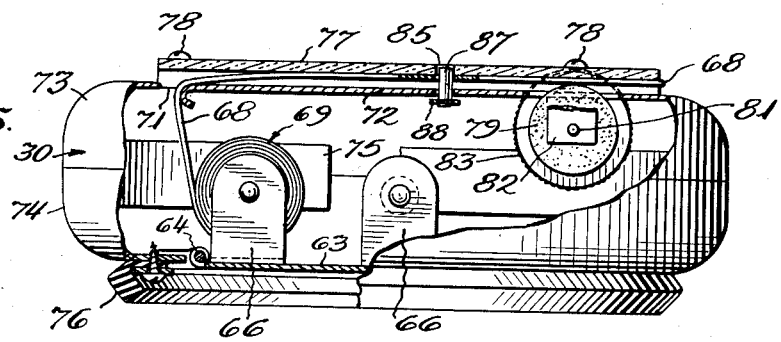
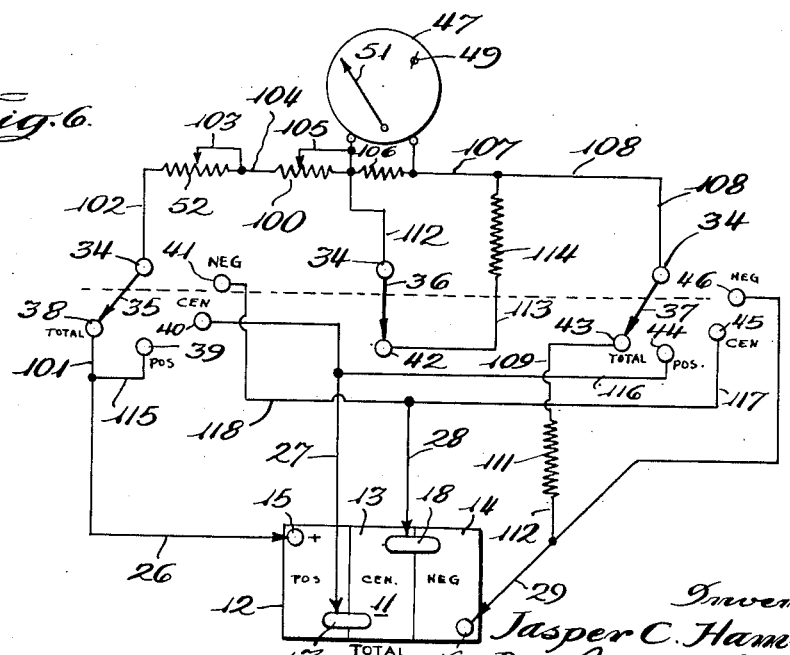

July 7, 1953
J. C. HAMMOND
2,644,739
BATTERY TESTER
Filed Feb. 7, 1949
4 Sheets-Sheet 3
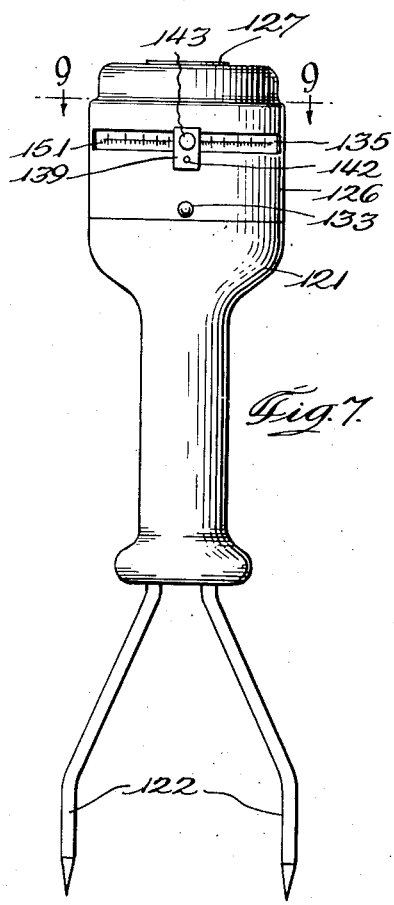
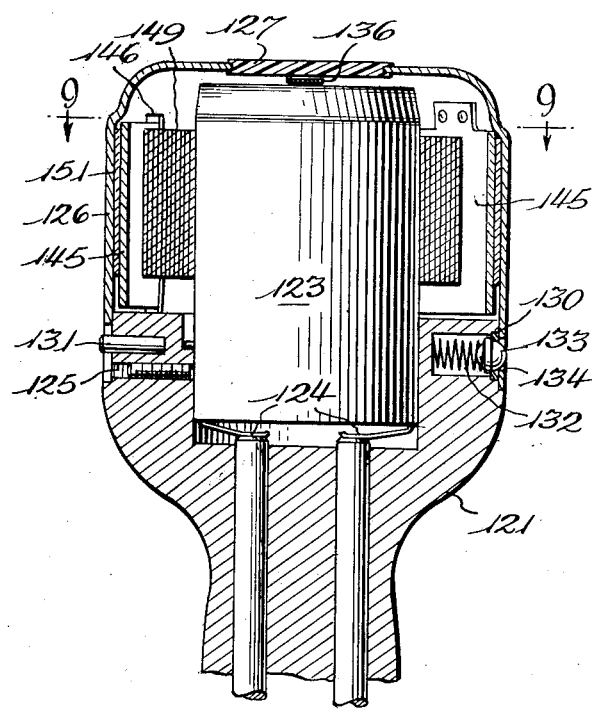
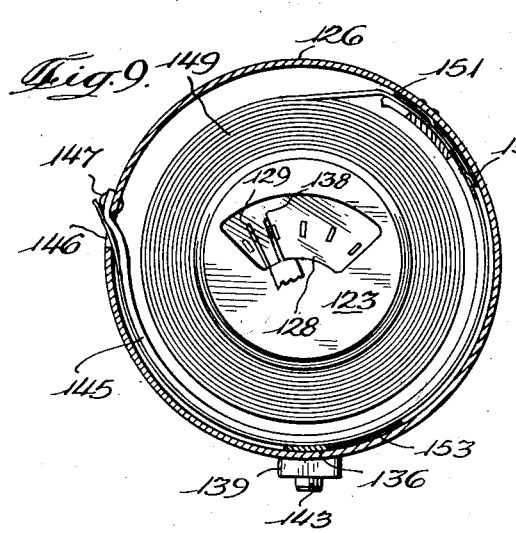
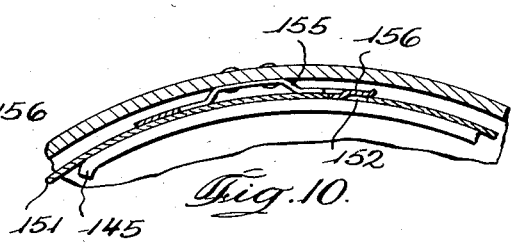
Inventor:
Jasper C. Hammond
By Bair & Freeman
Attorneys July 7, 1953　　　　　J. C. HAMMOND　　　　　2,644,739
BATTERY TESTER
Filed Feb. 7, 1949　　　　　　　　　　　　　　4 Sheets-Sheet 4
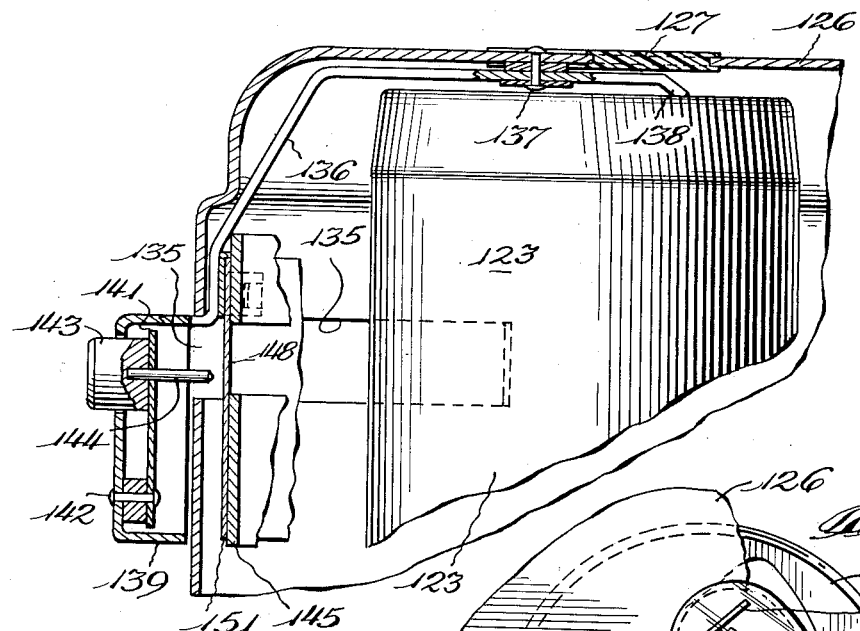
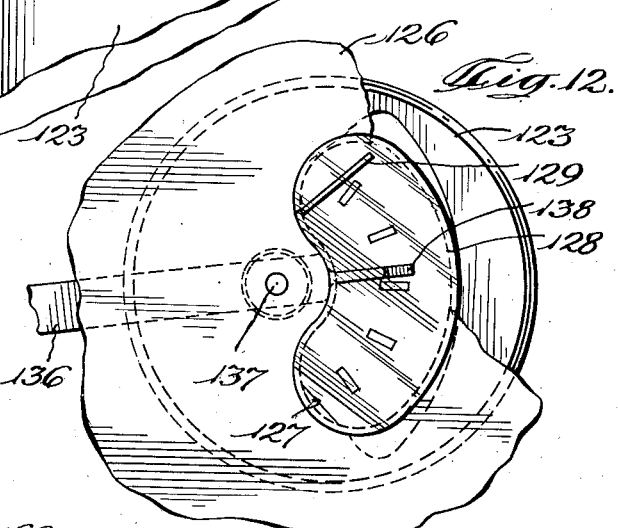
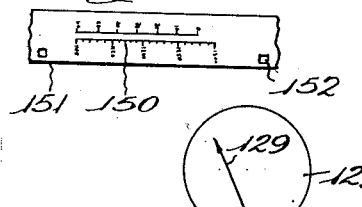
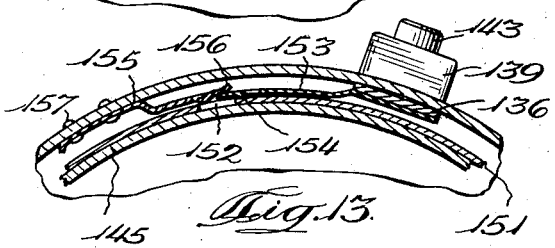
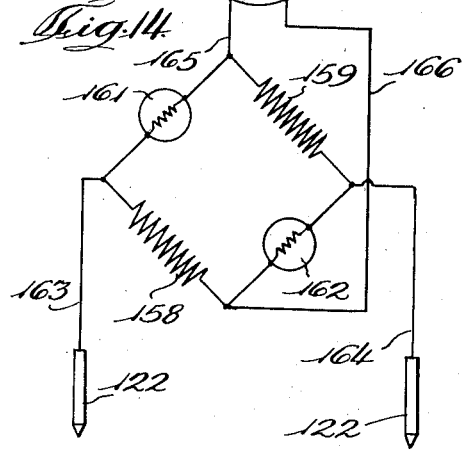
Inventor
Jasper C. Hammond
By Bair & Freeman
Attorneys Patented July 7, 1953

2,644,739

UNITED STATES PATENT OFFICE 2,644,739

BATTERY TESTER

Jasper C. Hammond, Minneapolis, Minn., assignor to Franklin Transformer Manufacturing Company, Inc., Minneapolis, Minn., a corporation of Minnesota Application February 7, 1949, Serial No. 74,981

5 Claims. (Cl. 346—79)

This invention relates to storage battery testers, and particularly to battery testers for quickly and accurately testing batteries either in an automobile, airplane, or the like, or when removed therefrom. Such testers are primarily adapted to give an indication of the charge condition of storage batteries.

Batteries have heretofore been tested for charge by connecting leads to positive and negative terminals thereof and placing an electrical meter and a load including a variable resistor in series with the terminals of the battery. With properly calibrated meters, resistances and with indicia associated therewith, the specific gravity of the electrolyte, the time necessary to fast charge the battery and a determination of the general condition of the cells may be determined by determining the discharge rate thereof when loaded. An example of such a battery tester in combination with a battery charger circuit is described in Merlin L. Pugh Patent No. 2,432,068, issued December 2, 1947. The present invention, however, relates to battery testers alone.

With testers of the type shown, for example, in the above Pugh patent, the customer or attendant must be present to read the testing meter and indicia when the test is actually made. Many times the customer is not present and is not told of the condition of his battery. Furthermore, in testing large numbers of batteries at one time, which is economical in some instances, no record of each battery test is available unless the tester takes time to write down the result of the test and attaches a tag to the battery.

It is, therefore, an object of the invention to provide a battery tester in which a permanent record of the test or tests made on individual batteries may be made.

It is also an object of the invention to provide a battery tester wherein a record is made of the condition of the battery partially as an incident of the making of the test.

It is an additional object of the invention to provide a battery tester which is adapted to provide a record of tests upon the entire battery or upon individual cells.

It is a further object of the invention to provide novel storage and feeding mechanism for a card, web or tape on which a visual record of battery condition is made, which tape may preferably be removed from the battery tester in individual cards or pieces.

It is another object of the invention to position a card, web or tape relative to a movable member for varying the resistance of a battery tester meter circuit so that a record of battery condition is obtained by coaction between the tape and said movable member.

It is also an object of the invention to position a card, web or tape relative to a part of the battery tester that is moved incident to testing so that a record of battery condition is made; and furthermore to properly position said card, web or tape on the tester.

It is an additional object of the invention to provide a compact, neat battery tester of the type described and to afford ready access to the interior thereof for refilling a magazine for the tape or web.

With these and other objects in view, the invention consists in the construction, arrangement and combination of the various parts of my device whereby the objects contemplated are attained, as hereinafter more fully set forth, pointed out in the claims and illustrated in the accompanying drawings, wherein:

Figure 1 is a top plan view of a battery tester for testing either a complete battery or the various cells thereof and illustrates terminals and leads connected to a battery to be tested;

Figure 2 is a partial vertical sectional view of the battery tester showing the feed roll construction for the tape or web;

Figure 3 is a partial elevational view of the interior of the door construction of the tester;

Figure 4 is a partial sectional view taken on line 4—4 of Figure 1;

Figure 5 is a side view of the battery tester with parts thereof broken away for the sake of clarity; and Figure 6 is a wiring diagram for the tester shown in Figure 1;

Figure 7 is a side view of a battery tester constructed in accordance with a second embodiment of the invention;

Figure 8 is a vertical sectional view of a portion of the battery tester shown in Figure 7;

Figure 9 is a sectional view taken on line 9—9 of Figures 7 or 8;

Figure 10 is a partial sectional view of the construction for holding the tape or web;

Figure 11 is an enlarged partial vertical sectional view of the battery tester;

Figure 12 is an enlarged partial top view of the apparatus;

Figure 13 is an enlarged sectional view of the construction for moving the tape or web;

Figure 14 is a diagrammatic wiring diagram for the battery tester shown in Figure 7; and Figure 15 is a view of one type of web or tape that may be used with the invention.

*Description of Figures 1 to 6, inclusive*

Referring specifically to the drawings for a detailed description of the first embodiment of the invention, numeral 11 designates generally a storage battery of the type used, for example, in automobiles. The storage battery includes a positive cell 12, a center cell 13, and a negative cell 14. The positive terminal is shown at 15 and the negative terminal at 16. The usual connecting bars between the center cell and the positive and negative cells are shown at 17 and 18. Flexible insulated cables are shown at 19 and 21. The cable 19 connects with two spring prods 22 and 23, which are adapted to make electrical contact with the positive terminal 15 and the bar 17, respectively. Cable 21 is provided with prods 24 and 25, which are adapted to make electrical contact with the bar 18 and negative terminal 16, respectively. Two conductors 26 and 27 are enclosed in cable 19, and two conductors 28 and 29 are enclosed in cable 21. These conductors connect respective prods to the battery tester generally indicated at 30.

The battery tester includes a switch 31 having a dial 32 thereon with suitable indicia. For example, the indicia may read "Total battery," "Positive cell," "Center cell" and "Negative cell." A switch operating handle and indicator is shown at 33 and the handle is pivoted for turning movement at 34. In Figure 6, the numeral 34 is given to the three pivotal electrical connections for three movable switch blades 35, 36 and 37, which are included in the switch 31. As shown in Figure 6, the switch 31 also contains one set of contacts adapted to be engaged by the switch blade 35, which contacts are numbered 38, 39, 40 and 41. A single contact 42 is adapted to be engaged by the switch blade 36. Another set of contacts 43, 44, 45 and 46 are adapted to be engaged by the switch blade 37.

The battery tester 30 also includes an electrical meter generally indicated at 47, which is preferably a galvanometer. The meter 47 includes a dial 48 having suitable indicia thereon including a "check line" indicated at 49. The meter 47 also includes an indicating needle 51. As best shown in Figures 4 and 6, the battery tester includes a variable resistor generally shown at 52. The variable resistor is provided with a rotatable adjusting arm 53 secured to a rotatable shaft 54, which extends into the resistor 52 to adjust or vary the same. The adjusting arm 53 for the variable resistor is provided with a horizontal slot 55, for a purpose to be described. A plunger 56, which is normally held in the raised position by a spring 57, is also held in the arm 53, for a purpose to be described. The plunger 56 is provided with a stop pin 58 and with a punch 59 at the lower, outer extremity of the adjusting arm 53 and is slidably supported on a plate 62 secured to the resistor 52.

The battery tester is contained in a casing comprising generally two cup-shaped stampings 73 and 74, which are frictionally held together by a flange 75 which is welded to one of the casing parts and engages with the other. A door 63 is hinged at 64 and is positioned in the bottom of the lower cup-shaped casing member 74. A sponge rubber ring 76 is secured to the bottom of the casing portion 74, so that the tester may be placed on a finished surface, such as an automobile body, without marring it.

Two generally U-shaped stampings 65, having spool engaging projections 66 extending inwardly from the upturned portions thereof, are secured to the door 63 by rivets 67. A spool of tape 68 is shown at 69. The web or tape is preferably formed of paper and has suitable indicia thereon, as will be hereinafter described. The door 63 is provided with a suitable spring latch 70.

The upper surface of the cup-shaped member 73 is shown at 72 and a slot 71 is formed therein for the passage of the tape from the spool 69. One bracket 65 may be used for storage of an unused spool. The tape 68 extends between the upper surface or plate 72 and a transparent plate 77, which is secured in spaced relation to the upper surface 72 by screws 78.

A feed roll for the web or tape 68 is shown at 79 in Figures 2 and 5. The feed roll is preferably made of rubber or other material which will grip and feed the tape 68 and is so positioned that it contacts the tape and rolls it between itself and the transparent plate 77.

The feed roll 79 is provided with an axle or shaft 81, which is journalled in brackets 82 secured to the inside of the upper surface 72 of the casing member 73. A knurled knob or wheel 83 is secured to the shaft 81 and extends through an opening 84 to a position above the surface 72 where it may be readily turned by the user. Obviously, as the wheel 83 is rotated in the proper direction, the tape 68 will be fed from the spool 69 through the slot 71 and between the plates 72 and 77. The purpose of moving the tape in this manner is to provide a detachable marked ticket or card for each battery tested.

A centering pin 87 extends through an opening 85 in the transparent plate 77 and through an opening 86 in the top plate 72 of casing 73. The pin is secured to a leaf spring 88, which in turn is riveted at 89 to a plunger 91. The plunger 91 extends through an opening 93, through the transparent plate 77 and the top plate 72. The leaf spring 88 is also riveted to the top plate 72 at 92. The spring 88 normally biases the pin 87 upwardly, and when the plunger 91 is depressed, the pin 87 is lowered.

The web 68 is provided at equally spaced intervals with holes 70, through which the centering pin 87 is adapted to extend. As the web or tape is turned by the feed roll 79 with one hand, the plunger 91 is depressed with the other, so that the tape will slide easily. When the hole 70 in the tape registers with the centering pin 87, the plunger 91 is released and the tape is held in its proper position. As the tape 68 is unwound and a predetermined length thereof positioned beyond the transparent plate 77, it may be torn off, the edge of the plate 77 providing a cutting edge for this purpose.

The tape has suitable indicia repeated thereon, as shown, for example, in Figure 1. The tape may read "If punch mark is in red, you are in danger." The tape also has repeated thereon a simulation of a dial which may be graduated in terms of the specific gravity of the electrolyte in the battery. It also may be graduated in terms of minutes time to charge with a fast charging battery charger. It also may have a portion of the simulation of a dial colored, for a purpose hereinafter described.

*Operation of Figures 1 to 6, inclusive*

When a battery is to be tested, the prods 22—23 and 24—25 are placed in the position shown in Figure 1. The arms to which the prods are attached are resilient and must be squeezed together slightly in order to place them in the position shown in Figure 1. The prods tend to expand and dig into the soft terminals and the bars on the battery to provide good electrical connections. The tape is positioned as shown in Figures 1 and 5, with the centering pin 85 extending through the hole 70 in the tape. Assuming that the total battery is to be tested, the knob 33 of switch 31 is turned to the position marked "Total battery." In this position, the switch arms are in the locations shown in Figure 6. Switch arm 35 is in engagement with contact 38, switch arm 36 is in engagement with contact 42, and switch arm 37 is in engagement with contact 43. A circuit is, therefore, established from the positive terminal 15 of the battery, through conductors 26 and 101, through contact 38, switch arm 35, and conductor 102 to the variable resistance 52. The movable arm of the variable resistor then conducts current through a conductor 103, a conductor 104, to a series resistance 100. This series resistance may be adjusted at the factory. Current from the series resistance passes through a conductor 105 and the meter 47. A shunt resistance 106 is provided across the meter so that it acts as an ammeter. Current also flows through a conductor 112, switch arm 36, contact 42 and conductor 113 to an added shunt resistance 114, which is utilized only when the total battery is tested to prevent damage to the meter 47. Current flows from the meter 47, through conductors 107 and 108, through switch arm 37, contact 43, and conductor 109 to a series resistance 111, which reduces the voltage passing through the circuit when the total battery is being tested, so that the meter is properly calibrated for the high current and voltage of the total battery. As the arm 53 of the variable resistor 52 is moved to add or cut out resistance, the needle 51 of meter 47 moves on the scale. When the needle 51 coincides with the check line 49, the standard open circuit voltage of the battery is such that it will cause a reading on the meter at the check line. If the battery is low in charge, practically all of the resistance 52 must be cut out before the check line is reached on the meter. If the battery is badly damaged, the check line will not be reached even with all the resistance cut out.

When the check line is reached, the plunger 56 is pushed downwardly by the tester and the punch 59 will punch the ticket or tape on the simulated dial. The punch mark will give an accurate indication of the specific gravity of the electrolyte in the battery. It will also give an indication of the number of minutes required to charge on a fast battery charger. If the punch mark is close to the 1300 mark on the specific gravity scale, the battery is substantially fully charged and is in good condition.

After the punch mark has been made, the tape 68 is moved by rotating the wheel 83 and the feed roller 79 until the next hole 70 registers with pin 87. During the rotation of the feed roll 79, the pin 87 is depressed, as described hereinbefore. When the next portion of the tape with the legends thereon is properly positioned, the pin 87 is again raised by releasing plunger 91 and extends through a hole 70.

When the punched ticket or card is torn off the tape, it may be placed in the automobile whose battery is being tested, or it may be given to the owner. In this manner, if the owner is not present when the battery is tested, he is given a visual record of the condition of his battery, and if it is bad, he is more likely to have it charged, or, if necessary, have it replaced. Furthermore, if a large number of batteries are being tested, or even if a single battery is being tested, the ticket may be torn off and attached to each battery so that a record of the specific gravity of the electrolyte and the time required to charge on a fast charger is available.

If it is desired to test each individual cell, the knob 33 is turned to the positions for testing successive cells. Upon the testing of each cell, a ticket may be punched and the cell number marked thereon. In this way, a record is made of the exact condition of each of the cells. Obviously, if one of the cells is broken down or sulphated to such an extent that the entire battery is worthless, this will be shown to the owner.

When the positive cell line is to be tested, the knob 33 is moved to positive cell and it moves the switch arms 35, 36, and 37 so that the switch arm 35 is in engagement with contact 39, switch arm 36 is disengaged from contact 32, and switch arm 37 is in engagement with contact 44. The resistances 111 and 114 are, therefore, removed from the circuit, since the lower current and voltage of a single cell is being recorded on the meter 47. A circuit is then established from the positive terminal 16 through conductor 26 and conductor 115 through contact 39 and switch arm 35. The remainder of the circuit is the same as described before, without the two resistances 111 and 114 and with the exception that the circuit is completed through switch arm 37, contact 44, conductor 116 and lead 27 to the bar 17 of the battery, which connects the positive and the center cells.

When it is desired to test the center cell, the knob 33 is turned to that position and it moves the contact arm 35 into engagement with contact 42 and contact arm 37 is in engagement with contact 45. A circuit is then established through lead 27 to contact 40 and through switch arm 35. Again the resistances 111 and 114 are cut out, and the remainder of the circuit is the same, except that it is completed through contact arm 37, contact 45, conductor 117, and lead 28 to the bar 18 of the battery connecting the center and negative cells.

When it is desired to test the negative cell, the knob 33 is turned to that position and switch arm 35 is moved into engagement with contact 41. Switch arm 36 remains out of engagement with contact 42 and switch arm 37 is in engagement with contact 46. A circuit is then set up from bar 18, through lead 28, and conductor 118 to contact 41 and switch arm 35. The rest of the circuit is again the same, the resistances 111 and 114 being cut out of the circuit, with the exception that the circuit is completed through switch arm 37, contact 46 and lead 29 to the negative terminal 16.

Description of Figures 7 to 15, inclusive

Referring now to Figures 7 to 15, inclusive, for a detailed description of the second embodiment of the invention, it is first noted that the battery tester is for testing a single cell rather than for testing either a single cell or the entire battery as disclosed in the first embodiment of the invention. Also, no variable resistance is utilized.

The battery tester includes a body portion 121, preferably made of wood or plastic material, and has two heavy conductors 122 embedded therein which terminate in prongs which are adapted to make good contact with the battery terminals.

A small electric meter is shown generally at 123 and is preferably a milliammeter. It has contacts 124 at the bottom thereof which engage with the respective conductors 122. A set screw 125 extends into one side of the main body 121 and retains the meter in a predetermined position. As the description progresses, it will be clear that the meter must be exactly positioned with respect to the remainder of the apparatus in order for it to properly function.

A cup-shaped sheet metal casing 126 is secured to the top of the body 121 in inverted position and is provided with a window 127 at the top thereof through which a dial 128 of the meter 123 is visible. The meter 123 is provided with the usual indicator needle 129. Pins 131 are embedded in the body 121 and extend through suitable apertures in the casing 126 to retain the casing in position. The casing 126 is readily detachable from the pins, however, by the provision of a spring pressed ball 133 which is held in position in the casing 126 by the spring 132. The ball 133 is limited in its movement in the casing by a stop 130, but projects a sufficient distance into an aperture 134 in the casing 126 to retain the casing in position until the ball 133 is manually depressed The casing 126 is provided with a horizontal slot or aperture 135 intermediate the top and bottom thereof. The slot 135 extends approximately one-third of the way around the casing 126.

A generally L-shaped arm 136 is disposed within the casing 126 and is pivoted to the top thereof by means of a pivot pin 137. The arm terminates in an indicator 138 which extends from one side of the pivot pin 137 beneath the window 127 and above the dial 128 of the meter 123.

The member 136 at its other end is shaped in the form of a handle 139. A leaf spring 141 is contained within the handle 139 and is secured thereto by a rivet 142. A push button 143 is secured to the leaf spring 141 and a pin 144 is secured to the button 143 and extends inwardly through the aperture 135 in casing 126.

Also disposed within the casing 126 is an annular tape or web retaining member 145, which is spaced a slight distance inwardly from the casing 126 but does not extend completely around the inside of the casing. The annular retaining member 145 extends through a vertical slot 146 in casing 126 and is secured to the casing by screws 147. The annular retaining member 145 is provided with a horizontal slot 148 which is in alignment with at least a portion of the horizontal slot 135 in casing 126, as best shown in Figure 11.

A web roll is shown at 149 and comprises a series of connected tickets 151, one of which is shown in Figure 15. This ticket is shown, by way of example, as many other types of indicating tickets may be used. The ticket which is shown in Figure 15 has indicia 150 thereon and has a square aperture 152 at the lower end of each ticket. The indicia 150 in one side of the ticket reads in minutes of charge and is divided into ten minute intervals for one hour. The indicia on the other side of the ticket indicates specific gravity and is graduated from 1100 to 1300 in intervals of ten units.

A spring member 153, preferably formed of Phosphor bronze, is secured to arm 136 and extends along the annular web retaining member 145 between that member and the casing 126. The spring 153 is best shown in Figure 13 and includes a portion 154 which is cut out from the spring 153 and bent downwardly.

Another Phosphor bronze spring 155 is disposed between the annular member 145 and the casing 126 and is also provided with a cut out portion and bent upwardly, as shown at 156. The spring 155 is secured to the casing 126 by rivets 157. The springs 153 and 155 extend toward each other and, when the handle 139 is moved to one of the extreme ends of slot 135, the end 154 of spring 153 rides under the bent portion 156 of spring 155, thus lifting portion 156. When a test is being made the portion 156 of spring 155 enters the aperture 152 on one of the tickets 151 and retains it in position. It is obvious that the spool 149 is disposed around the upper portion of meter casing 123 and a series of tickets is led between the annular member 145 and the casing 126. The end of one of the tickets 151 extends up to the aperture or slot 146 in casing 126.

When the handle 139 is moved to the position shown in Figure 13, the bent portion 154 of spring 153 lifts portion 156 of spring 155 out of aperture 152 and it in turn enters the aperture 152. As the handle 139 is reversed in its movement by manual manipulation, the portion 154 of spring 153 will draw the tickets 151 from roll 149 and one ticket will be expelled through the vertical slot 146. After the handle 139 reaches the other end of its travel in slot 135 by the tester manually moving the same, the individual ticket is torn off by the operator tearing it against the relatively sharp edge of the slot 146.

The circuit shown in Figure 14 is contained within the body of the meter 123 and is a simple Wheatstone bridge type of circuit. It includes balance resistances 158 and 159 and balance resistances 161 and 162, the latter preferably in the form of small incandescent lamps. One of the terminals 122 is connected to one side of the circuit by a conductor 163 and the other terminal 122 is connected to the other side of the circuit by a conductor 164. The Wheatstone bridge circuit is connected to the meter 123 by conductors 165 and 166.

*Operation of Figures 7 to 15, inclusive*

When a battery is to be tested, the sharp ends of conductors 122 are forced into contact with the battery terminals with the result that the needle 129 of meter 123 will give a certain indication with respect to dial 128 of the meter. The meter of this circuit indicates very sensitively the open circuit voltage condition of the battery and it is the slight variations in open circuit voltage which are reflected in expanded fashion on the meter to which the mechanical ticket punching mechanism is adjusted. The position of the needle 129 may be observed through the window 127. The tester then moves the handle 139 to a position in which the indicator 138 of arm 136 coincides with the needle 129. The operator then presses the button 143 so that pin 144 perforates a ticket 151 which has been properly positioned across or behind aperture 135 in casing 126. The proper positioning of the ticket is accomplished by the spring 153 having moved a ticket into position by manual movement of handle 139, as described above. The operator, after punching the ticket, moves the handle 139 to one end of slot 135, whereupon spring 155 is disengaged from the aperture 152 in ticket 151, spring 153 engages in the aperture 152 and, as the handle 139 is moved to the other end of slot 135, a ticket will be ejected through slot 146, where it may be torn off and given to the user or placed on the battery.

The indicia on the ticket, the calibration of the meter, the resistances, and the position of the pin 144 when a battery is being tested, are all correlated so that an accurate indication will be punched on the ticket of the number of minutes required to fast charge the battery and also the specific gravity of the electrolyte in the particular cell being tested. Obviously other types of indicia could be used which might be divided into zones or marked with different colors to give various information to the tester and the customer.

From the foregoing it will be apparent that both embodiments of the invention provide compact battery testers in which a record of the condition of the battery is made available during the testing operation. It is obvious also that instead of moving the punch, the punch may remain stationary and tape or web be moved to a position where, when the punch is operated, a correct indication of battery condition is made on the tape.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. An indicator for battery testing apparatus comprising a casing, a manually movable member which is movable by the tester, a removable impression receiving means positioned in said casing, indicia on said impression receiving means to indicate battery condition, manual means associated with said manually movable member for marking said impression means and means on the impression receiving means and said movable member for indexing the impression receiving means with respect to the casing.

2. An indicator for battery testing apparatus comprising a casing, a manually movable member which is movable by the tester, a removable impression receiving means positioned in said casing, indicia on said impression receiving means to indicate battery condition, manual means associated with said manually movable member for marking said impression means and means on the impression receiving means and said movable member for indexing the impression receiving means with respect to the casing and for moving the said impression receiving means when desired.

3. An indicator for battery testing apparatus comprising a casing, a movable member having at least a portion thereof extending outside the casing for manual movement by the tester, a detachable impression receiving means comprising a roll of material disposed internally of the casing, said impression receiving means being printed in individual ticket form, a slot in said casing, manually operated marking means secured to the movable means and having a portion movable into the slot in the casing, means for positioning a ticket in alignment with the slot so that said marking means may contact the ticket, means affording movement of a ticket out of the casing to a position where it may be detached from the roll, and annular retaining means spaced from the casing to guide the ticket forms from the roll and to retain one of them in position relative to the slot.

4. An indicator for battery testing apparatus comprising a casing, a movable member having at least a portion thereof extending outside the casing for manual movement by the tester, a detachable impression receiving means comprising a roll of material disposed internally of the casing, said impression receiving means being printed in individual ticket form, a slot in said casing, manually operated marking means secured to the movable means and having a portion movable into the slot in the casing, means for positioning a ticket in alignment with the slot so that said marking means may contact the ticket, means affording movement of a ticket out of the casing to a position where it may be detached from the roll, annular retaining means spaced from the casing to guide the ticket forms from the roll and to retain one of them in position relative to the slot, and spring means between the annular retaining means and the casing to retain a ticket form properly aligned with the slot.

5. An indicator for battery testing apparatus comprising a casing, a movable member having at least a portion thereof extending outside the casing for manual movement by the tester, a detachable impression receiving means comprising a roll of material disposed internally of the casing, said impression receiving means being printed in individual ticket form, a slot in said casing, manually operated marking means secured to the movable means and having a portion movable into the slot in the casing, means for positioning a ticket in alignment with the slot so that said marking means may contact the ticket, means affording movement of a ticket out of the casing to a position where it may be detached from the roll, annular retaining means spaced from the casing to guide the ticket forms from the roll and to retain one of them in position relative to the slot, spring means between the annular retaining means and the casing to retain a ticket form properly aligned with the slot, and means secured to the movable member and disposed between the annular retaining means and the casing to release the spring means and to move the ticket form to the exterior of the casing where it may be detached.

JASPER C. HAMMOND.

References Cited in the file of this patent

UNITED STATES PATENTS

| Number | Name | Date |
| --- | --- | --- |
| 440,839 | Coffin | Nov. 18, 1890 |
| 959,313 | Crabbs | May 24, 1910 |
| 1,019,482 | Kennedy | Mar. 5, 1912 |
| 1,198,586 | Sanborn et al. | Sept. 19, 1916 |
| 1,415,528 | Craighead | May 9, 1922 |
| 1,742,216 | Rauber | Jan. 7, 1930 |
| 2,219,942 | Rowe | Oct. 29, 1940 |
| 2,267,826 | Heyer | Dec. 30, 1941 |
| 2,295,578 | Heyer | Sept. 15, 1942 |

FOREIGN PATENTS

| Number | Country | Date |
| --- | --- | --- |
| 108,770 | Great Britain | Aug. 23, 1917 |